June 7, 1932.  B. E. HOUSE ET AL  1,862,309
BRAKE
Filed May 21, 1930
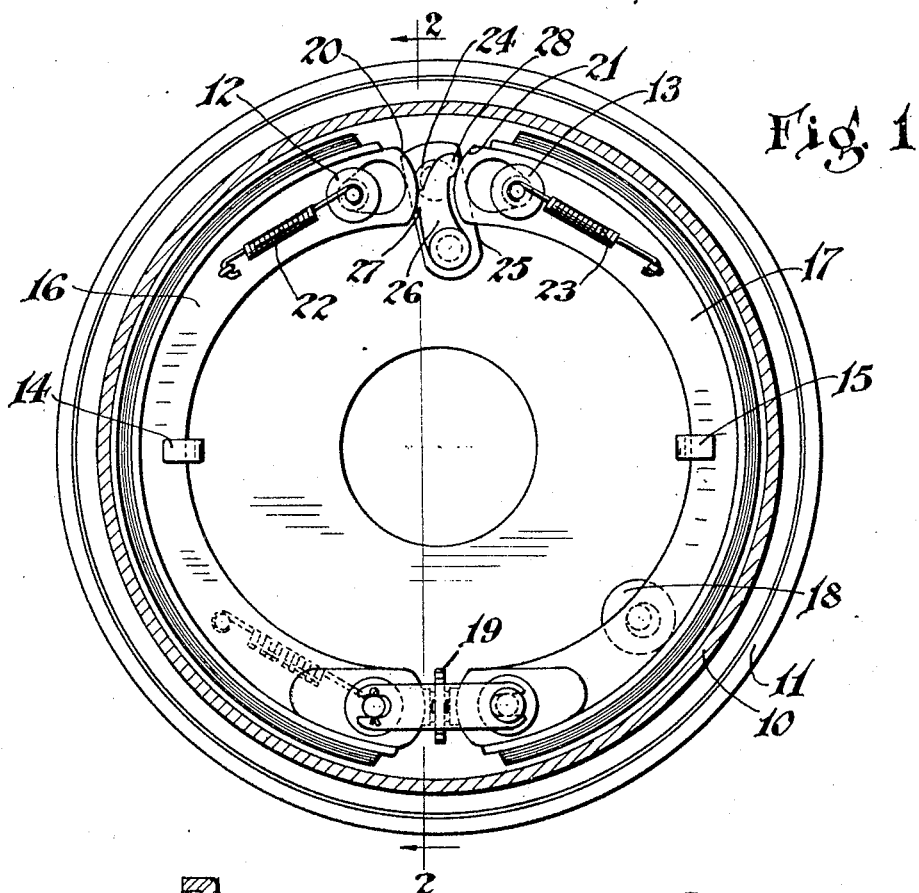
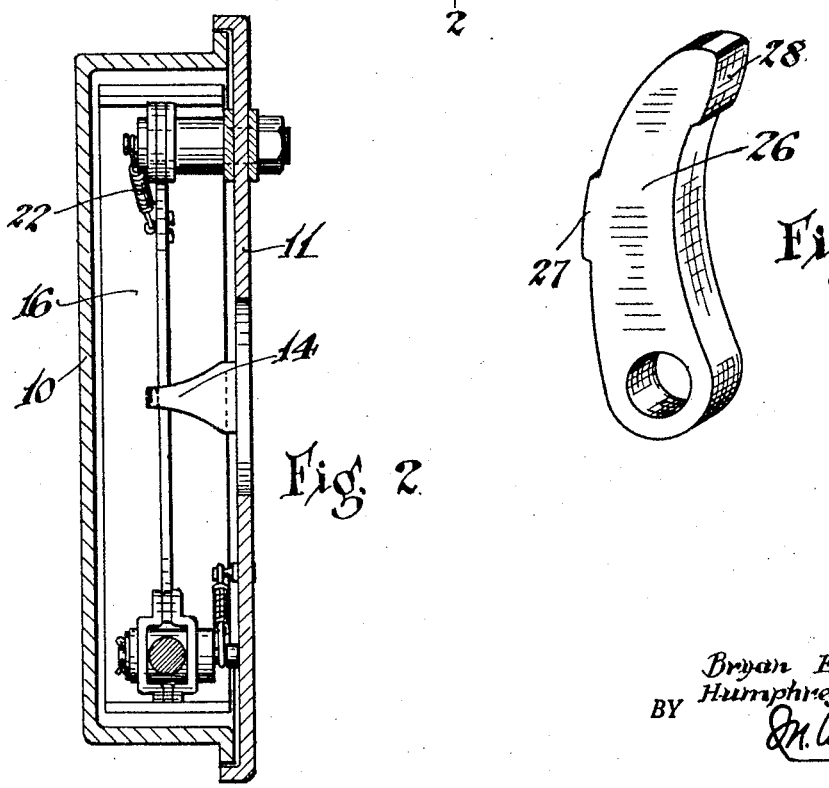
INVENTORS
Bryan E. House
Humphrey F. Parker
BY
M. W. McConkey
ATTORN.

Patented June 7, 1932

1,862,309

UNITED STATES PATENT OFFICE

BRYAN E. HOUSE AND HUMPHREY F. PARKER, OF SOUTH BEND, INDIANA, ASSIGNORS TO BENDIX BRAKE COMPANY, OF SOUTH BEND, INDIANA, A CORPORATION OF ILLINOIS

BRAKE

Application filed May 21, 1930. Serial No. 454,249.

This invention relates to brakes and more particularly to internal expanding brakes.

A major object of the invention is to improve the applying means of a brake mechanism.

An important object of the invention is the provision of a novel structure for actuating the friction members of a brake.

Another object of the invention is to simplify the actuating means for the friction members of a brake by materially reducing the number of parts and to simplify the parts, so that the liability of inoperativeness may be greatly reduced.

A further object of the invention is to provide an operating means for the friction elements of a brake wherein the cost of production may be materially reduced.

A feature of the invention is a one piece operating cam for actuating the friction elements of a brake mechanism.

Other objects of the invention will appear from the following description taken in connection with the drawing, which forms a part of this specification, and in which:

Figure 1 is a side elevation of a brake illustrating one embodiment of the invention;

Figure 2 is a sectional view substantially on line 2—2, Figure 1; and

Figure 3 is a perspective view of the cam.

Referring to the drawing for more specific details of the invention, 10 represents a drum positioned in the open end of which is a fixed support, such as a backing plate 11. The backing plate has positioned thereon suitable anchors 12 and 13 and steady rests 14 and 15. Positioned on the anchor 12 is a primary shoe 16 held against displacement by the steady rest 14, and positioned on the anchor 13 is a secondary shoe 17 held against displacement by the steady rest 15. The secondary shoe has in engagement therewith an eccentric 18 positioned on the backing plate. This eccentric is adaptable for adjustment to locate the shoes when in an off position in spaced relation to the drum with sufficient clearance.

As shown, the articulating ends of the shoes are connected by a suitable adjustment screw 19, and the other ends of the shoes are provided with rounded shoulders 20 and 21. The primary and secondary shoes are connected by suitable springs 22 and 23 to the respective binding posts 12 and 13. These springs serve to return the shoes to the off position. They also serve to raise the shoes against the anchors 12 and 13 and the steady rests 14 and 15 with sufficient force to prevent rattling of the shoes when in an off position.

Positioned for rotation on the backing plate 10 is an operating shaft 24. This shaft is positioned substantially centrally between the shoulders 20 and 21 and secured to the shaft is an arm 25 on the free end of which is pivoted a cam 26 having lobes 27 and 28. The lobe 27 is adapted to engage the rounded shoulder 20 on the primary brake shoe 16 and the lobe 28 engages the shoulder 21 on the secondary shoe 17.

In operation, when the shaft 24 is rotated, the arm 25 is moved through an arc carrying with it the pivotal end of the cam 26. This movement directs forces in opposite directions through the lobes 27 and 28 on the rounded shoulders 20 and 21, and these forces spread the shoes for engagement with the drum.

While one illustrative embodiment has been described, it is not our intention to limit the scope of the invention to that particular embodiment, or otherwise than by the terms of the appended claims.

Having thus described the various features of the invention, what we claim as new and desire to secure by Letters Patent is:

1. A brake comprising a rotatable drum, a fixed support, friction members movable on the support, rounded shoulders on the friction member, an operating shaft rotatably mounted on the support, an arm carried by the shaft, a cam pivotally connected to the free end of the arm and lobes on the cam having line contact with the rounded shoulders on the friction members.

2. A brake comprising a fixed support, a rotatable drum associated therewith, friction elements on the support adapted for cooperation with the drum, rounded shoulders on the friction element, an operating shaft rotatably positioned on the support, an arm carried by the shaft, an arcuate member pivotally connected to the free end of the arm and lobes on the arcuate member arranged in spaced relation and having line contact with the rounded shoulders on the friction elements.

In testimony whereof, we have hereunto signed our names.

B. E. HOUSE.
HUMPHREY F. PARKER.